US008653369B2

(12) United States Patent
Hui et al.

(10) Patent No.: US 8,653,369 B2
(45) Date of Patent: Feb. 18, 2014

(54) ELECTRICALLY CONDUCTIVE BUOYANT CABLE

(75) Inventors: Wing-kin Hui, Hong Kong (HK); Wing-tak Hui, Hong Kong (HK)

(73) Assignee: Smartpool LLC, Lakewood, NJ (US)

( * ) Notice: Subject to any disclaimer, the term of this patent is extended or adjusted under 35 U.S.C. 154(b) by 234 days.

(21) Appl. No.: 13/229,759

(22) Filed: Sep. 11, 2011

(65) Prior Publication Data

US 2013/0062092 A1 Mar. 14, 2013

(51) Int. Cl.

| | |
|---|---|
| ***H01B 7/12*** | (2006.01) |
| ***H02G 3/00*** | (2006.01) |
| ***H01B 7/18*** | (2006.01) |
| ***H01B 7/00*** | (2006.01) |

(52) U.S. Cl.
USPC ... 174/101.5; 174/70 R; 174/107; 174/113 R; 174/120 R; 174/121 R

(58) Field of Classification Search
USPC ........... 174/101.5, 107, 113 R, 120 R, 121 R, 174/68.1, 70 R, 99 R
See application file for complete search history.

(56) References Cited

U.S. PATENT DOCUMENTS 3,766,307 A * 10/1973 Andrews, Jr. .................. 174/47
4,185,887 A * 1/1980 Ferrentino .................... 385/114
5,250,756 A * 10/1993 Swift et al. ................ 174/119 R
5,630,003 A * 5/1997 Arroyo ......................... 385/113
5,689,601 A * 11/1997 Hager et al. .................. 385/100
5,854,444 A * 12/1998 Fehlhaber ................... 174/84 R
6,631,229 B1 * 10/2003 Norris et al. .................. 385/109
2003/0106704 A1 * 6/2003 Isley et al. ................. 174/113 R
2004/0000419 A1 * 1/2004 Clendenen .................. 174/72 A
2004/0035603 A1 * 2/2004 Clark et al. ............... 174/113 R
2004/0112628 A1 * 6/2004 Brandi et al. ............. 174/113 R
2008/0296040 A1 * 12/2008 Hui ............................ 174/101.5
2009/0074367 A1 * 3/2009 Shinoski et al. .............. 385/113
2010/0314162 A1 * 12/2010 Gardner et al. ............... 174/258

* cited by examiner

*Primary Examiner* — Timothy Thompson
*Assistant Examiner* — Sherman Ng
(74) *Attorney, Agent, or Firm* — Birch, Stewart, Kolasch & Birch, LLP

(57) ABSTRACT

Disclosed herein is an electrically conductive buoyant cable. The cable includes an electrical conductor member having at least one pair of electrical conductors. The electrical conductors are embedded into a core member. The core member defines a filler layer. A reinforcing member is similarly embedded into the core. The reinforcing member includes strands of reinforcing fibers. The reinforcing members are grouped to support the electrical conductor and prevent delamination. A skin member surrounds the core member and encapsulates the members and prevents water penetration. A tie down member secures each end of the cable while an end cap is fitted over the tie down member. The end cap is sized and shaped for compatible engagement with the desired movable device and a power source.

18 Claims, 3 Drawing Sheets

ELECTRICALLY CONDUCTIVE BUOYANT CABLE

This case is related to U.S. Ser. No. 12/100,409, filed Apr. 10, 2008. At least one of the inventors here to the same as the above named application. The entire application of Ser. No. 12/100,409 is incorporated herein by reference and is to be used for all purposes consistent with such incorporation whether in the background or detailed description or anywhere in the application.

FIELD OF THE INVENTION

This invention relates to an electrically conductive cable. More particularly, this invention relates to an electrically conductive buoyant cable used to electrically connect movable devices to an electrical source.

TECHNICAL BACKGROUND

An electrically conductive buoyant cable is an electrical cable having a relative density below 1. The cable typically includes one or more conductors. Because the relative density of the electrically conductive buoyant cable is below 1, it will float on the surface of the water. In relevant cases to this application, the electrically conductive buoyant cable is connected to a movable mechanical device. More specifically, such a cable is used for under water applications, such as a pool cleaning vehicles, e.g. pool sweep or robotic pool cleaners. The electrically conductive buoyant cable is used to provide an electrical power source to the pool cleaning vehicles (PCV). Using the cable, it will be appreciated that a major part of the cable floats on the water. The remaining part of the cable runs between the cleaning device at the bottom of the water and the water surface.

The above-described electrically conductive buoyant cable will not stay totally under the water. Remaining totally under water would hinder the normal performance of the cleaning device. For example, the cable could become entwined with the cleaning device preventing the device from moving along the pool surface. As a result of the cable being buoyant, it will not rest upon the floor of the pool having water in it.

An additional advantage of the cable being buoyant is that it will not become entwined with obstacles on the floor of the pool while the pool has water in it. If a non-buoyant cable were used and rested at the bottom of the water, it would cause a great amount of tension to be exerted the cable. In fact, such a cable could reach its maximum value and break. Such breakage would cause the cable to cease to be able to perform its function.

In order to be successful, the electrically conductive buoyant cable must have a certain amount of flexibility. Otherwise, the working area of the pool-cleaning device will be greatly limited. Also, the moving speed and moving direction of the device will be affected. During operation, the electrically conductive buoyant cable may be affected by torque, pressure and tension exerted by outside obstacles. In order to prevent these forces from damaging the electrically conductive buoyant cable, improvements are needed.

FIG. 1 shows a sectional view of a known electrically conductive buoyant cable 100. The cable 100 includes a core 104 defining a filler layer; a woven fiber layer 106 surrounding the core 104; a second filler layer 108 surrounding the fiber layer 106 and a jacket 22 surrounding the second filler layer 108. A pair of conductors 110 are embedded through the first filler layer 104.

Each of the filler layers 104 and 108 have a relative density less than 1. Thus, giving the cable 100 an overall relative density lower than 1 and the ability to float. The fiber layer 106 made from woven fibers, which are used to withstand the tensile force exerted on the cable 100.

The conductors 110 are a pair of electrical wires, which are typically straight or twisted. The conductor 110 typically includes waterproof and insulating material for good protection. It will be appreciated if such waterproofing and insulating material are twisted excessively cable damage can easily result.

Other examples of such cables are also known. For example, there are cables where a soft hollow tube encloses the conductor. Thus, with the same mass, the volume of the electrically conductive buoyant cable increases. Therefore, it has increased buoyancy. However, the hollow part of this kind of electrically conductive buoyant cable does not contain any components to withstand pressure. The electrically conductive buoyant cable will deform once there is sufficient outside pressure. This deformation leads to a decrease in the volume of the cable and thus causing the cable to lose buoyancy. Also, the jacket and the filler layer of this cable example are made of different materials. Using different materials increases the likelihood that there will be layer separation.

In this example, the electrically conductive buoyant cable will easily deform when it is subjected to certain types of torque. Once the cable starts to deform, all the deformation will focus on the part, which deforms the earliest. As a result, the electrically conductive buoyant cable of this example can fold upon itself and irreversibly deform. Furthermore, using a cable of this construction increases the likelihood that water will leak into the soft hollow tube damaging all or part of the cable. Such leakage will consequently lead to loss of buoyancy of the entire cable.

Also in this example, the soft hollow tube and the conductor enclosed in the tube have a tendency to separate when the electrically conductive buoyant cable is subject to a tensioning force. Typically, the force exerted upon the tube and the conductor will be different. The reaction of each element is therefore also different. So, there is a likelihood that there will be layer separation causing the cable to become irreversibly deformed after the tensioning force.

In another example of the electrically conductive buoyant cable, a foaming plastic or rubber material is used to surround the conductor. Such material is used to increase the buoyancy of the buoyant cable. The use of foaming plastic or rubber material with air pockets to increase buoyancy typically lowers the tensile resistance of the cable. In normal operation, the cable will be subjected to a higher tension force during the extension and withdrawal actions of placement and removal of the pool-cleaning device from the pool, respectively.

When in use, the cable must withstand pressure when deep under water. In these situations, the cable may collapse and deform because of its cable construction having a foaming material. The cable may therefore become damaged when deep under water. There also exists here the problem of layer separation in this example as well.

In the next example of the electrically conductive buoyant cable, the plastic material is mixed with micro-spheres and is wrapped around the coaxial cable. Plastic or other insulating material of low relative density is used to make the jacket of this electrically conductive buoyant cable. This cable has buoyancy and tension resistance capability. However, fusion is not possible between the plastic and the micro-spheres. The junction between them can only withstand limited ripping force. If that limit is exceeded, there will likely be layer separation.

Additionally, in this example, there is a saturation point where further increase quantity of micro-spheres is not possible. Generally, known technology makes it difficult to have more than 40 percent by volume of micro-spheres embedded in plastic material. One drawback of this construction is that the diameter of the cable as well as the thickness of the buoyant material is increased. Additionally, the flexibility of the cable, especially its ability to bend is reduced. The micro-spheres are embedded in the jacket of the cable, which is made of the plastic or insulating material. Furthermore, the construction consistent with the above, weakens the physical properties of the cable jacket. Such weakening may cause the jacket to be unable to resist abrasion and become torn.

The electrically conductive buoyant cables mentioned above consist of a multi-layers structure, made from different materials. During the manufacturing process, it is needed to compress several times in order to finish the production of an entire cable. This leads to higher than necessary manufacturing costs.

The invention of the buoyant tether cable (the U.S. Pat. No. 4,110,554) relates to another multi-layered buoyant tether cable. The buoyant tether cable consists of a circular jacket and a center stress core has a plurality of stress bearing elements contained within a core tape binder. There are three pairs of conductor elements including a first pair, a second pair and a third pair and additional conductor element. All the above elements twine around the central stress core. The three pairs of conductor elements can be identical.

The center stress core has six-stress bearing elements contained within a core tape binder. Six stress bearing elements are cabled around a central core element in a six around one configuration. The central core element is arranged on the longitudinal axis of the entire buoyant tether cable. Each stress-bearing element is preferably composed of three-stress bearing members twisted among themselves, which are, in turn, contained within a jacket. This arrangement provides a tension bearing capability to the buoyant tether cable.

The conductor core of each conductor element in each of the pairs of conductor elements can be a hollow low density, high strength plastic for increased buoyancy. Cabled around the conductor element core are five insulated, twisted pairs of conductive wires. The conductor core and the five conductive wires are enclosed by the low-density, high strength plastic-like conductor tape binder.

The circular jacket circumferentially surrounds the plurality of conductor elements, which are cabled around the center stress core. Accordingly, interstices are formed between the center stress core with the conductor elements and the outer circular jacket. Interstices are substantially filled with a quantity of micro-spheres in a silicone oil medium, so as to increase the buoyancy of the buoyant tether cable.

In the interstices nearer to the circular jacket are seven interstitial stress members. Each interstitial stress member contains at least two stress-bearing members twisted between or among themselves and cabled within the interstices and enclosed in a jacket of a high strength, low-density plastic-like material similar to the circular jackets.

This buoyant tether cable contains a honeycomb structure. The buoyancy of the cable is increased. The pressure and tension resistance capability is also increased. The cable will not easily deform. However, the flexibility of this buoyant tether cable is poor. The cable consists of a multi-layered structure, which is made of different materials. Also, micro-spheres are added into the filler layer. Once the buoyant tether cable is being twisted, it will not be able to withstand the torque. The cable will be damaged and deformed, and the problem of layer separation may easily happen. Since the structure of this cable is rather complicated, the manufacturing procedure will be complicated and the manufacturing cost will also be high.

The invention of the floating cable (Chinese patent CNO1279396) relates to a floating cable. FIG. 4 shows a sectional view of this new floating cable. The floating cable includes a coaxial wire (40), twisted wires (41) and a silk rope (42). They are enclosed by a frothy polyethylene (43). The frothy polyethylene (43) is enclosed by a light and heat resisting polyethylene protection layer (44). The coaxial wire (40) is made of the high-tension resistance copper core layer (404), the low density insulating polyethylene layer (403), the high-tension resistance copper cover layer (402) and the light and heat resisting polyethylene protection layer (401). The order of the components are arranged from inside to outside, which means the copper wire layer is the inner layer while the protection layer is the outer layer. The twisted wires (41) consist of high-tension resistance copper core layer (414) at the inside and the low density insulating polyethylene layer at the outside (413). Their outer layers consist of polyester cover (412) at the inside and light and heat resisting polyethylene protection layer (411) at the outside.

This floating cable consists of a multi-layered structure and different layers are made of different materials. There are infusible materials located far away from the central axis of the floating cable. When the cable is twisted or bent, fusion cannot occur between the two neighboring layers of different materials. The polyester cover layer (412) cannot fuse with the neighboring light and heat resisting polyethylene protection layer (411). The low density insulating polyethylene layer (413) cannot fuse with the neighboring polyester cover layer (412). The low density insulating polyethylene layer (413) cannot fuse with the neighboring high-tension resistance copper core layer (414). The high-tension resistance copper cover layer (402) cannot fuse with the neighboring light and heat resisting polyethylene protection layer (401). The low density insulating polyethylene layer (403) cannot fuse with the neighboring high-tension resistance copper cover layer (402). The high-tension resistance copper core layer (404) cannot fuse with the neighboring low density insulating polyethylene layer (403). The silk rope (42) cannot fuse with the neighboring frothy polyethylene layer (43). This leads to the phenomenon of layer separation. Moreover, the manufacturing procedures will be complicated and the manufacturing cost will be high due to the multi-layered structure of the floating cable.

The prior art while useful has been shown to have certain defects during applications. Improvements are therefore needed.

SUMMARY OF THE INVENTION

According to the mentioned disadvantages of the known devices, it is a general object of the buoyant cable in accordance with this invention to provide an electrically conductive buoyant cable having good buoyancy, greater flexibility and the ability to resist higher tensioning forces without delamination or other cable damage. At the same time, it is an object of the cable in accordance with the invention to resist permanent deformation and to avoid layer separation delamination.

In accordance with the objects set forth above and as will be described more fully below, the pool light assembly in accordance with this invention, comprises:

an improved electrically conductive buoyant cable, comprising:

a multi-member cable including:

a core member;

a reinforcing member coaxial with the core member and being within the core member;

electrical conductive member, defining electrical conductors coextensive and coaxial with the reinforcing member and within the core member; and a skin member surrounding the former members.

In a exemplary embodiment, the cable includes a tie down member at either end of the cable. The conductors extend beyond the core member. The reinforcing member includes strands of reinforcing fibers and at least two pair of strands of such fiber also extends beyond the core member. The conductors and strands fit into and around the tie down member for securing each end of the cable.

It is an advantage of the electrically conductive buoyant cable of this invention to have a structure to resist permanent deformation, while maintaining flexibility.

It is another advantage of the cable in accordance with the invention to separately secure each end of the cable to minimize torsional forces on the cable.

BRIEF DESCRIPTION OF THE DRAWING

For a further understanding of the objects and advantages of the present invention, reference should be made to the following detailed description, taken in conjunction with the accompanying drawing, in which like parts are given like reference numerals and wherein.

DETAILED DESCRIPTION OF THE INVENTION

In order to appreciate the invention herein, one must appreciate the need in the art as set forth in the Background. Most importantly, the structure of the instant invention herein resolves the long felt need of preventing cable delamination. The structure of the instant invention allows the cable to bend and flex in all ways common and desirable for a cable of this type, while retaining structural integrity.

Figure 1:
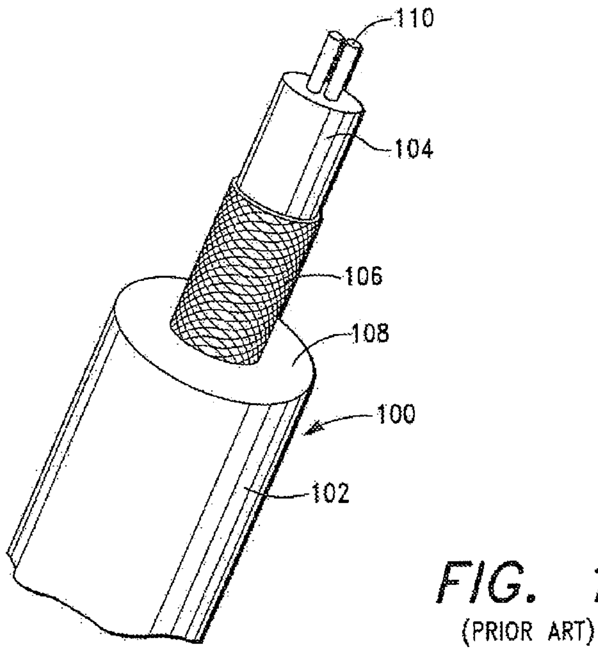
FIG. 1 (PRIOR ART)
FIG. 1 is a perspective view illustrating a prior art exemplar of the electrically conductive buoyant.
Figure 2:
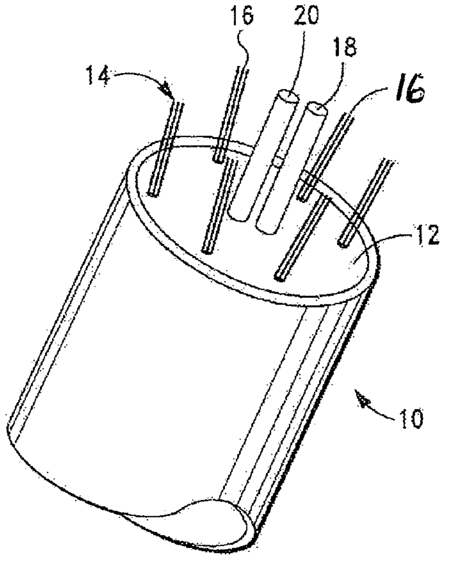
FIG. 2 is an exemplary embodiment of the electrically conductive buoyant cable in accordance with this invention.
Figure 3:
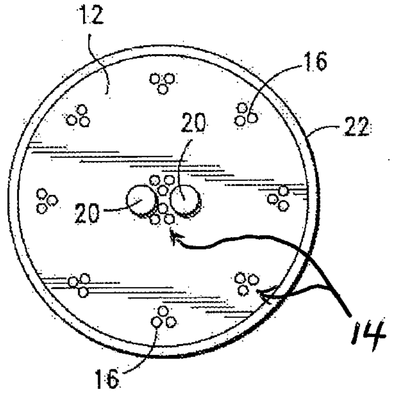
FIG. 3 is a sectional view of exemplary embodiment of the electrically conductive buoyant cable in accordance with this invention.

With particular reference to FIGS. 2-7, the instant invention will now be described. FIGS. 2 and 3 show the basic structure of the electrically conductive buoyant cable in accordance with this invention generally denoted by the numeral 10. The cable is multiple layer cable, in which various members make up the layers. As shown, the cable includes a core member 12. The core member 12 is a filler layer and made from a foamed elastomer.

A reinforcing member 14 is coaxial with the core member 12. The reinforcing member 14 is within the core member 12 as shown, and includes a series of reinforcing strands 16. The strands 16 are organized in one exemplary embodiment into groups. More particularly, the strands 16 of the reinforcing member 14, in the exemplary embodiment shown in FIGS. 2 and 3 are in groups of three strands 16. It will be appreciated that groups of two or four or more strands 16 are possible within the spirit and scope of this invention.

The cable 10 further includes an electrical conductor member 18. In the exemplary embodiment shown, the conductor member 18 includes a pair of conductors 20. The conductors 20 are co-extensive and coaxial with the reinforcing member 14. Further, the conductor member 18 is within the core member 12. More particularly, the conductor member 18 is centrally located within the core member 12. And, in one exemplary embodiment, the conductor member 18 is located centrally within the core member 12.

The previously describe members, 12, 14, 18 are surrounded and protected by a skin member 22. The skin member 22 is nonporous and impenetrable by water. In an exemplary embodiment, the skin member 22 is solid and made from PVC or polyvinylchloride. In this way, the skin member 22 is made of a non-foam construction, which promotes a sealed cable. It will be appreciated that the skin member 22 can be made from any elastomeric material within the spirit and scope of the invention.

It will be appreciated that once water gets into the core member of such cable construction, delamination becomes possible, if not likely. Thus, providing a solid skin, impenetrable by water, is a first basic step to preventing such delamination.

Figure 4:
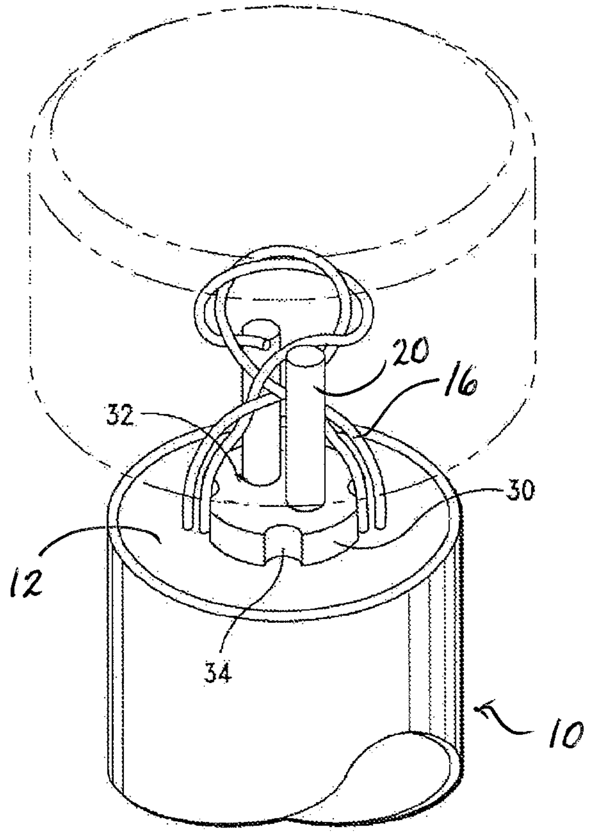
FIG. 4 is a perspective view of the electrically conductive buoyant cable in accordance with this invention shown in the process of using the tie down.
Figure 5:
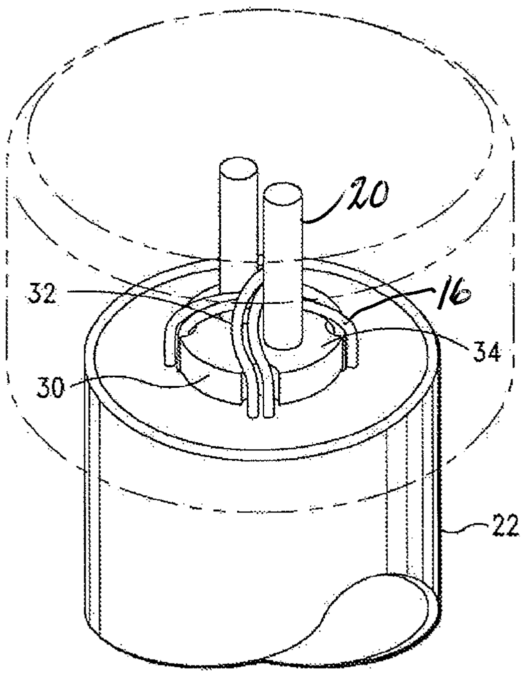
FIG. 5 is a perspective view of the electrically conductive buoyant cable in accordance with this invention upon completion of the process of using the tie down.

As illustrated in FIGS. 4 and 5, the exemplary embodiment of the cable 10 includes a tie down member 30. The conductors 20, as well as two pair of strands 16 of the reinforcing members 14 extend beyond the core member 12 and skin member 22.

The tie down member 30 is sized and shaped to fit compatibly with the conductors 20. In the exemplary embodiment shown in FIGS. 4 and 5, the tie down member 30 is substantially disc-shaped, is designed to be rest on an end of the core member 12, and has openings 32 to enable the conductors 20 to pass through the tie down member. The strands 16 of the reinforcing members 14 extend over the tie down member 30 and rest on guides 34 formed around the perimeter of the tie down member 30 in order to facilitate a secure tying of end of the cable 10. The strands 16 of the reinforcing members 14 are threaded between the conductors 20 and secured by tying, as best shown in FIG. 5. As the strands (threads) 16 of the reinforcing member 14 are tightened against the guides 34, the knots between ends of the strands 16 are tied and secured, thereby securing the end of the cable 10. In an exemplary embodiment, both ends of the cable 10 are tied.

When both ends of the cable 10 tied in the manner described above and illustrated in FIGS. 4 and 5, the cable 10 can be twisted and pulled over and over again without having breakdown and separation between and among the core member 12, the reinforcing member 14, the conductive member 18, and the skin member 22 of the cable 10, and without losing electrical viability of the cable 10. The cable 10 consequently makes the devices attached thereto more reliable, thereby reducing user costs.

Figure 6:
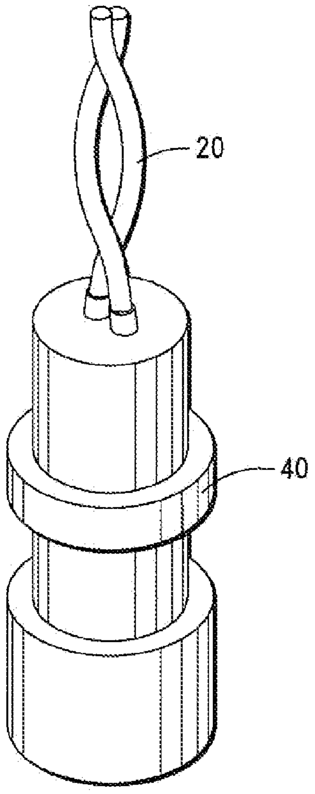
FIG. 6 is a perspective view of one end the electrically conductive buoyant cable in accordance with this invention having an end cap attached.
Figure 7:
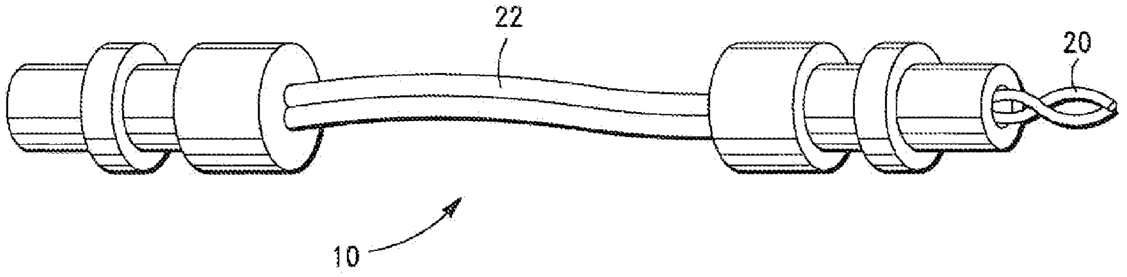
FIG. 7 is a perspective view of an exemplary embodiment of the electrically conductive buoyant cable in accordance with this invention having end caps at each end of the cable.

With particularly reference to FIGS. 6 and 7, there is shown an exemplary embodiment of the cable assembly in accordance with this invention having end cap assemblies 40. FIG. 6 illustrates the conductors 20 extending through the end cap 40. Thusly, the conductors 20 are connected to a device of the user's choosing.

FIG. 7 illustrates the entire cable 10 in accordance with the invention having end caps 40 on both ends of cable 10. The conductors 20 extend from the end of the core member 12. The end caps 40 are sized and shaped to fit the desired use and connection to the movable device of choice.

While the foregoing detailed description has described several embodiments of the pool cleaning vehicle power cable in accordance with this invention, it is to be understood that the above description is illustrative only and not limiting of the disclosed invention. It will be appreciated there are also various modifications to the cable that are suitable for use in the exemplary embodiments discussed above and that there are numerous embodiments that are not mentioned but within the scope and spirit of this invention. Thus, the invention is to be limited only by the claims as set forth below.

What is claimed is:

1. An improved electrically conductive buoyant cable, comprising a multi-member cable including:

a core member;

a reinforcing member disposed within the core member and extending along a length thereof;

an electrical conductive member, defining electrical conductors also disposed within the core member and extending along the length thereof;

a skin member surrounding each of the core member, the reinforcing member and the electrical conductive member and extending along the length thereof, and a substantially flat tie down member resting on an end of the core member, the tie down member including:

openings to enable the conductors of the conductive member to pass through the flat tie down member, and guide grooves formed around an outer perimeter of the flat tie down member to enable strands of the reinforcing member to extend up from the core member, along the guide grooves, and to be tied over the tie down member, thereby securing the tie down member in place.

2. The electrically conductive buoyant cable, as set forth in claim 1, wherein the skin member comprises a solid skin.

3. The electrically conductive buoyant cable, as set forth in claim 1, wherein the skin member comprises a solid skin polyvinylchloride (PVC).

4. The electrically conductive buoyant cable, as set forth in claim 1, wherein the skin member comprises a solid skin, which is non-foam.

5. The electrically conductive buoyant cable, as set forth in claim 1, wherein the skin member comprises a solid skin impenetrable by water.

6. The electrically conductive buoyant cable, as set forth in claim 1, wherein the reinforcing member includes a series of fiberglass strands.

7. The electrically conductive buoyant cable, as set forth in claim 6, wherein the fiberglass strands are in groups.

8. The electrically conductive buoyant cable, as set forth in claim 6, wherein the fiberglass strands are in groups of three.

9. The electrically conductive buoyant cable, as set forth in claim 6, wherein the fiberglass strands are in groups of two.

10. The electrically conductive buoyant cable, as set forth in claim 6, wherein the fiberglass strands are in groups, and at least two of the groups of reinforcing members are proximate to at least one of the conductor members.

11. The electrically conductive buoyant cable, as set forth in claim 6, wherein the core member has a center, the fiberglass strands of the reinforcing member are in groups, and at least two groups of the fiberglass strands are proximate the center.

12. The electrically conductive buoyant cable, as set forth in claim 6, wherein the cable has a first and a second end, and at least two of the fiberglass strands of the reinforcing member and the electrically conductive member extend beyond one end of the cable.

13. The electrically conductive buoyant cable, as set forth in claim 12, wherein the cable includes two of the tie down members, one at either end of the cable, and wherein the at least two of the fiberglass strands of the reinforcing member and the electrically conductive member extend beyond both ends of the cable, and each end of the cable is adapted to be tied over the corresponding tie down member, thereby securing both of the ends of the cable.

14. The electrically conductive buoyant cable, as set forth in claim 1, wherein the core member comprises a filler layer consisting of foam material.

15. The electrically conductive buoyant cable, as set forth in claim 1, wherein the cable has a first and a second end, and the cable includes end caps.

16. The electrically conductive buoyant cable, as set forth in claim 13, wherein the cable has a first and a second end, and the cable includes end caps.

17. An improved electrically conductive buoyant cable, comprising a multi-member cable including:

a core member;

a reinforcing member coaxial and being within the core member;

an electrical conductive member, defining conductors coextensive and coaxial with the reinforcing member; and a skin member surrounding each of the core member, the reinforcing member and the electrical conductive member;

means for preventing delamination among the core member, the reinforcing member, the conductive member, and the skin member of the cable, and a substantially flat tie down member resting on an end of the core member, the tie down member including:

openings to enable the conductors of the conductive member to pass through the flat tie down member, and guide grooves fanned around an outer perimeter of the flat tie down member to enable strands of the reinforcing member to extend up from the core member, along the guide grooves, and to be tied over the tie down member, thereby securing the tie down member in place.

18. The electrically conductive buoyant cable, as set forth in claim 17, wherein the means for preventing delamination includes a capability of the reinforcing members to enable the cable to bend and flex without causing the core member, the reinforcing member, the conductive member, and the skin member of the cable to separate from one another.

* * * * *